United States Patent [19]
Fong et al.

[11] Patent Number: 5,119,236
[45] Date of Patent: Jun. 2, 1992

[54] SPLIT MIRROR VISION AUGMENTATION SYSTEM

[75] Inventors: Craig S. Fong, Torrance; Dean W. Brown, Rancho Palos Verdes; Kaori E. Matsunaga, Hawthorne, all of Calif.

[73] Assignee: Rockwell International Corporation, Seal Beach, Calif.

[21] Appl. No.: 601,543

[22] Filed: Oct. 22, 1990

[51] Int. Cl.⁵ .................................. G02B 27/14
[52] U.S. Cl. .................................. 359/630; 359/633; 359/850; 340/705
[58] Field of Search ............... 350/174, 602, 604, 618, 350/622, 623; 340/705, 980; 359/630, 633, 850, 402, 403, 405

[56] References Cited
U.S. PATENT DOCUMENTS

| | | | |
|---|---|---|---|
| 3,415,951 | 10/1968 | Heller | 350/174 |
| 4,099,841 | 7/1978 | Ellis | 350/174 |
| 4,225,215 | 9/1980 | Cojan | 350/174 |
| 4,561,733 | 12/1985 | Kreischer | 350/602 |
| 4,688,879 | 8/1987 | Fairchild | 350/174 |
| 4,725,125 | 2/1988 | Ellis et al. | 350/174 |
| 5,015,083 | 5/1991 | Wurst et al. | 350/174 |

Primary Examiner—Bruce Y. Arnold
Assistant Examiner—R. D. Shafer
Attorney, Agent, or Firm—Lawrence N. Ginsberg; Charles T. Silberberg

[57] ABSTRACT

A split mirror vision augmentation system for high performance aircraft is disclosed comprising a transparency, an adjustable external mirror, a first internal mirror, and at least a second internal mirror. The external mirror is positionable at a stowed position adjacent to the transparency and substantially flush with the outer skin and is also positionable at at least one deployed position for reflecting light received from a field-of-view exterior to the aircraft. The first internal mirror is located within the aircraft, at an orientation substantially parallel to the external mirror. It receives a first portion of the light reflected from the external mirror and through the transparency. When the external mirror is deployed, the first internal mirror is constructed and arranged to redirect the reflected first portion of light toward a crew member of the aircraft. Thus, a first view is provided from the vantage of a first "apparent eye" position located aft of the external mirror. The second internal mirror is also located within the aircraft at an orientation substantially parallel to the external mirror. It receives a second portion of the light reflected from the external mirror and through the transparency. When the external mirror is deployed, the second internal mirror redirects the second portion of reflected light toward the crew member, thus providing a second view from the vantage of a second "apparent eye" position located aft of the internal mirror.

1 Claim, 2 Drawing Sheets

SPLIT MIRROR VISION AUGMENTATION SYSTEM

STATEMENT OF GOVERNMENT INTEREST

This invention was made with Government support under Contract No. F33657-86-C-2127 awarded by the United States Air Force. The Government has certain rights in this invention.

BACKGROUND OF THE INVENTION

1. Field of the Invention

This invention relates to augmented vision systems, and more particularly to a front view mirror system particularly adapted for vehicles in which an operator is so positioned that he has no direct "line of sight" access to a field of view which is essential to success of his operating function.

2. Description of the Related Art

Modern high speed hypersonic aircraft and transatmospheric space vehicles depend in large part on transparencies for visual cues to the craft commanders charged with piloting the vehicles to conventional runway landings. Streamlining of these crafts' mold lines calls for shallow impact angles on external surfaces and minimal disturbances to flow lines for efficient flight in the atmosphere. This feature of long shallow surfaces and minimal flow line disturbance would require large areas of conventional transparencies for even marginal line of sight access by the pilot to runway surfaces and navigation aides such as beacons and strobed cues. Transparencies are heavier and bulkier than the stronger composites or special high temperature metals used for craft structure and they are less able to contain harmful radiation and reject thermal energy than conventional structural materials. Long, sloping areas necessary to preserve streamlines for forward facing transparencies also compromise optical quality of presentations to crew members.

Under constraints of minimizing weight and preserving stream lines, providing a pilot with "out-the-window" vision has become a major design criterion for modern hypersonic aircraft. The current Concorde supersonic transport provides such visibility to its crew through a "droop-nose" arrangement whereby the nose section, forward of the cockpit and flight crew, is hinged downward during its low speed takeoff and landing operations. Rockwell International's XB-70 incorporated a long windshield ramp covering its main forward transparency to preserve streamlines and provide the necessary line-of-sight access of the pilot to his craft's runways when the covering is removed.

The latter two installations were designed to provide compliance with MIL-STD-850, Aircrew Station Vision Requirements for Military Aircraft. Similar standards were met during the development of the SST, Concorde, and other commercial transports. For next generation hypersonic, transatmospheric space vehicles and high Mach number military fighter craft, the above solutions to vision satisfaction problems are not applicable. High aerodynamic loads, thermodynamic considerations and weight penalties associated with transparencies in structure negate the most basic of considerations that must be made.

Alternatives to direct view systems include periscopes, radar, television cameras, focal plane sensors and others, none of which provides the "feel" required by pilots for guiding their craft at up to 200 miles an hour onto concrete runways only a few craft lengths in width.

In response to the above-discussed problems, S. Wurst and K. Matsunaga developed a novel Vision Augmentation System, Ser. No. 522,487, assigned to Rockwell International Corporation, hereby incorporated by reference, which discloses a vision system comprising a transparency, an adjustable external mirror, means for positioning the external mirror, and a cockpit mirror means. The external mirror is positionable at a stowed position adjacent the transparency which is constructed in a portion of the fuselage of the aircraft. In that stowed position the external mirror is substantially flush with the outer skin of the fuselage to maintain the aerodynamic integrity of the aircraft during high speed flight. The external mirror is positionable at least one deployed position for reflecting light received from a field of view exterior to the aircraft, during low speeds of travel. The cockpit mirror means is located internal the aircraft for receiving light reflected from the external mirror and through the transparency when the external mirror is deployed. The cockpit mirror means is constructed and arranged to redirect the reflected light toward a crew member of the aircraft, thus providing a real-time, three-dimensional view from the vantage of an "apparent eye" position located aft of the external mirror. Thus, the vision augmentation system preserves depth perception cues.

During the course of the prosecution of the Wurst et al case, present Applicants have studied avenues for minimizing the external mirror size. Reduction in this mirror size is desired for its resulting decreased weight and aerodynamic drag.

OBJECTS AND SUMMARY OF THE INVENTION

Accordingly, it is a principle object of the present invention to provide the pilot of an aircraft, operating in a submerged cockpit, with a real-time, real world, three-dimensional view of space over the nose of his craft, while preserving craft streamlines at high speed flight, minimizing use of transparencies in craft structure and minimizing the size of the external mirror.

Another object is to increase the size of the effective field of view.

These objects are achieved by the present invention, which uses two internal mirrors. In its broadest aspects, the Split Mirror vision Augmentation system of the present invention comprises a transparency, an adjustable external mirror, means for positioning the external mirror, a first internal mirror, and at least a second internal mirror. The transparency is constructed in a portion of the fuselage of the aircraft. The external mirror is positionable at a stowed position adjacent to the transparency and substantially flush with the outer skin of the fuselage so as to maintain the aerodynamic integrity of the aircraft during high speed flight. The external mirror is also positionable at least one deployed position for reflecting light received from a field-of-view exterior to the aircraft, during low speed travel.

The first internal mirror is located within the aircraft, at an orientation substantially parallel to the external mirror. It receives a first portion of the light reflected from the external mirror and through the transparency. When the external mirror is deployed, the first internal mirror is constructed and arranged to redirect the reflected first portion of light toward a crew member of the aircraft. Thus, a first view is provided from the vantage of a first "apparent eye" position located aft of the external mirror.

The second internal mirror is also located within the aircraft. It is located at an orientation substantially parallel to the external mirror and receives a second portion of the light reflected from the external mirror and through the transparency. When the external mirror is deployed, the second internal mirror redirects the second portion of reflected light toward the crew member, thus providing a second view from the vantage of a second "apparent eye" position located aft of the internal mirror. The first and second mirrors are arranged and constructed so that the first and second internal mirrors do not substantially obstruct each others' views. When both first and second internal mirrors are viewed simultaneously, the resulting view appears as a substantially single continuous view.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
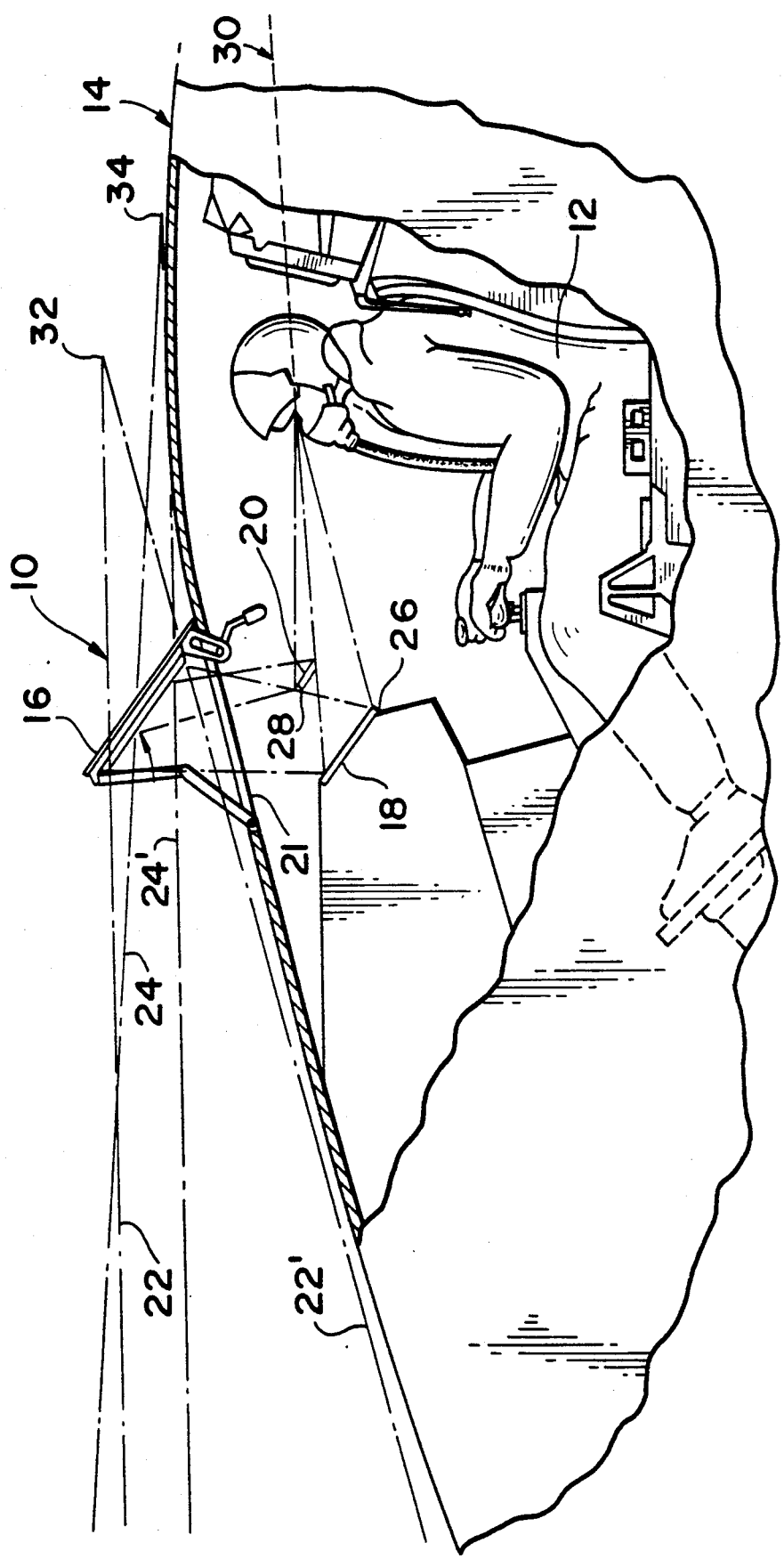
FIG. 1 is a sectional side view of the split mirror vision augmentation system of the present invention, showing the external mirror deployed for operation.

Referring to the drawings and the characters of reference marked thereon, FIG. 1 illustrates the overall arrangement of the split mirror vision augmentation system of the present invention, designated generally as 10. The crew member 12 of a high performance aircraft 14 is shown at the controls of his aircraft. As in the previous, Wurst et al case (U.S. Ser. No. 522,487), incorporated herein by reference, a single external mirror 16 is utilized. However, instead of the single internal mirror disclosed in that parent case, two internal mirrors 18, 20 are used. All three mirrors are substantially parallel to each other. The term "aircraft" as used herein refers broadly to conventional aircraft as well as other aerospace vehicles, such as hypersonic vehicles.

The internal downlook mirror 18 is positioned so that when the external mirror 16 is deployed, a reflected first portion of light, designated by numerals 22, 22' is reflected through a transparency 21, off of the internal downlook mirror 18 and redirected toward the crew member 12.

A second portion of light, designated by numerals 24, 24' is reflected off of the internal uplook mirror 20 and redirected toward the crew member 12.

Figure 2:
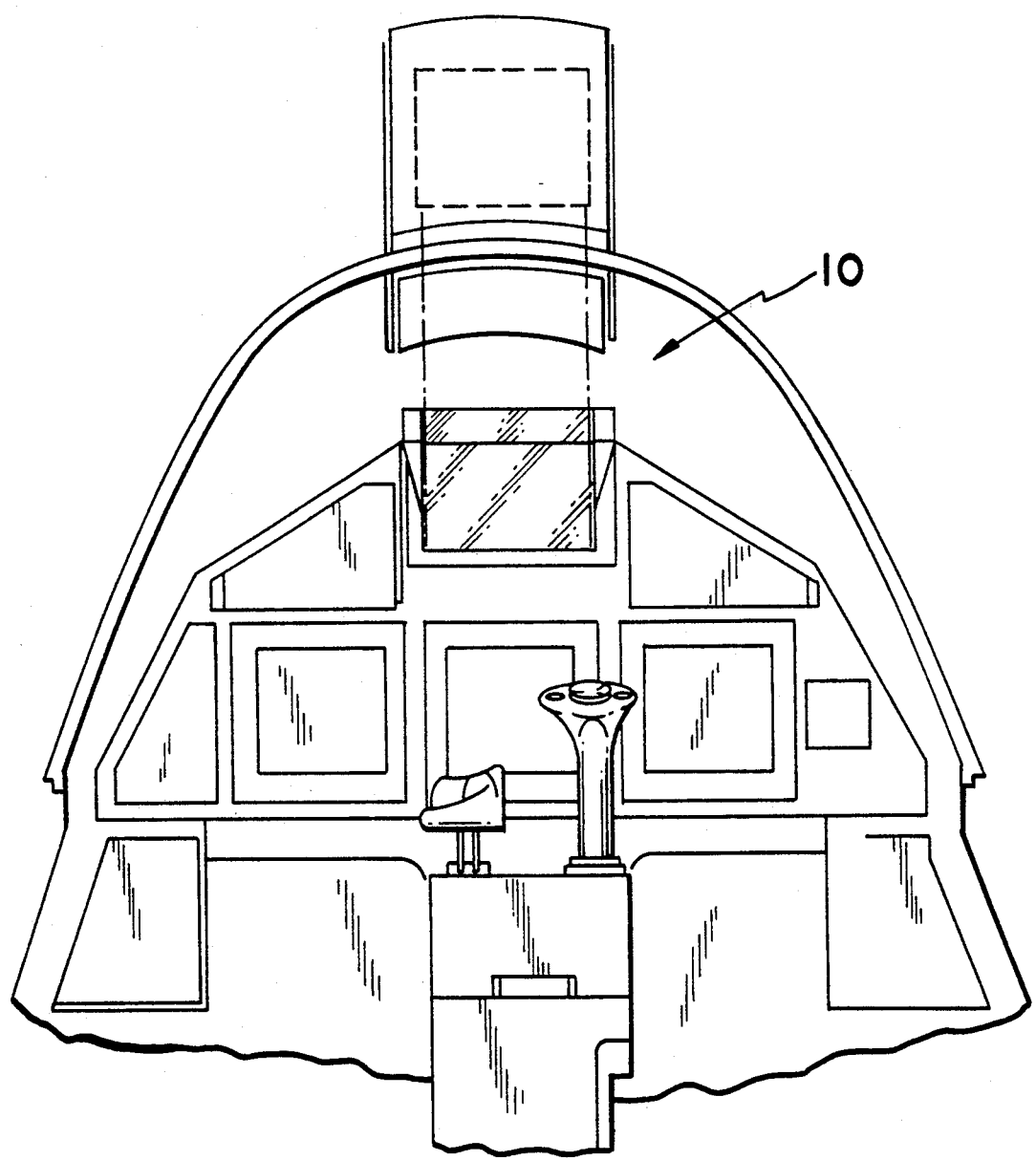
FIG. 2 is a forward looking view of the vision augmentation system for a tandem or single-seat aircraft.

The trailing edge 26 of downlook mirror 18 is preferably positioned just beyond the leading edge 28 of the uplook mirror 20, with reference to the crew member's horizontal vision line 30. Thus, a near continuous view is provided to the crew member 12. The view from the crew member is illustrated in FIG. 2.

Due to the geometrical relationship between the various mirrors, the views seen are not from the vantage point of the actual eye position but from "apparent" eye locations 32, 34 just aft of the external mirror 16, as illustrated in FIG. 1.

Although use of this split mirror configuration 10 results in some parallax with the two internal mirror views, the parallax is apparent only for objects close to the mirror system. Investigation has revealed that this parallax essentially disappears at about 600 ft., which is approximately the minimum distance that a crew in a high performance aircraft would be looking forward.

The present split mirror configuration maintains the advantages of the vision augmentation system disclosed in the parent Wurst et al case, however, it allows reduction in the external mirror size by allowing multiple reflections (i.e. uplook and downlook) from a single portion of the external mirror. This translates to decreased weight and aerodynamic drag.

On the other hand, if design considerations emphasize a need for an increased field-of-view, the external mirror size may be sized, as in the parent case. Use of the same size external mirror with two internal mirrors, as illustrated, results in an increased field-of-view.

As in the previous Wurst et al case the external mirror 16 may be deployed by any convenient means. The simplified deployment system, illustrated in FIG. 1, could include any of a variety of deployment means used in high speed aerospace vehicles. Similarly, the internal mirrors 18, 20 may be mounted by any conventional means, however, such mountings should have capabilities for fine adjustments, to maintain the geometrical relationships described hereinabove.

Obviously, many modifications and variations of the present invention are possible in light of the above teachings. It is, to be understood, that within the scope of the appended claims the invention may be practiced otherwise than as specifically described.

For example, although the downlook and uplook mirrors are positioned, as illustrated in FIG. 1, other orientations are possible so long as the uplook mirror does not obstruct the optical path of the reflected light from the downlook mirror.

What is claimed and desired to be secured by Letters Patent of the United States is:

1. A split mirror vision augmentation system for a high performance aircraft, comprising:
   (a) a transparency constructed in a portion of the fuselage of said aircraft at a desired location;
   (b) an adjustable external mirror positionable at,
      (i) a stowed position adjacent to said transparency and substantially flush with the outer skin of the fuselage so as to maintain the aerodynamic integrity of the aircraft during high speed flight, and
      (ii) at least one deployed position for reflecting light received from a field of view exterior to the aircraft, during low speed travel;
   (c) means for positioning said external mirror;
   (d) a first internal mirror defining a downlook mirror, located within the aircraft, at an orientation substantially parallel to said external mirror, for receiving a first portion of the light reflected from the external mirror and through the transparency, when the external mirror is deployed, said first internal mirror being so constructed and arranged to redirect the reflected first portion of light toward a crew member of the aircraft, thus providing a first view from the vantage of a first "apparent eye" position located aft of the external mirror; and
   (e) at least a second internal mirror, defining an uplook mirror, located within the aircraft, at an orientation substantially parallel to said external mirror, for receiving a second portion of the light reflected from the external mirror and through the transparency, when the external mirror is deployed, a trailing edge of said downlook mirror being positioned just forward the leading edge of the uplook mirror with reference to a crew member's horizontal vision line to redirect said second portion of reflected light toward said crew member, thus providing a second view from the vantage of a second "apparent eye" position located aft of the internal mirror, the first and second internal mirrors not obstructing each others' views and providing a near continuous view, the split vision augmentation system preserving depth perception cues, the second internal mirror providing an enlarged external field of view.

\* \* \* \* \*